Feb. 12, 1952 J. S. BAKER 2,585,213
PROCESSING MACHINE
Filed Jan. 10, 1946 2 SHEETS—SHEET 1
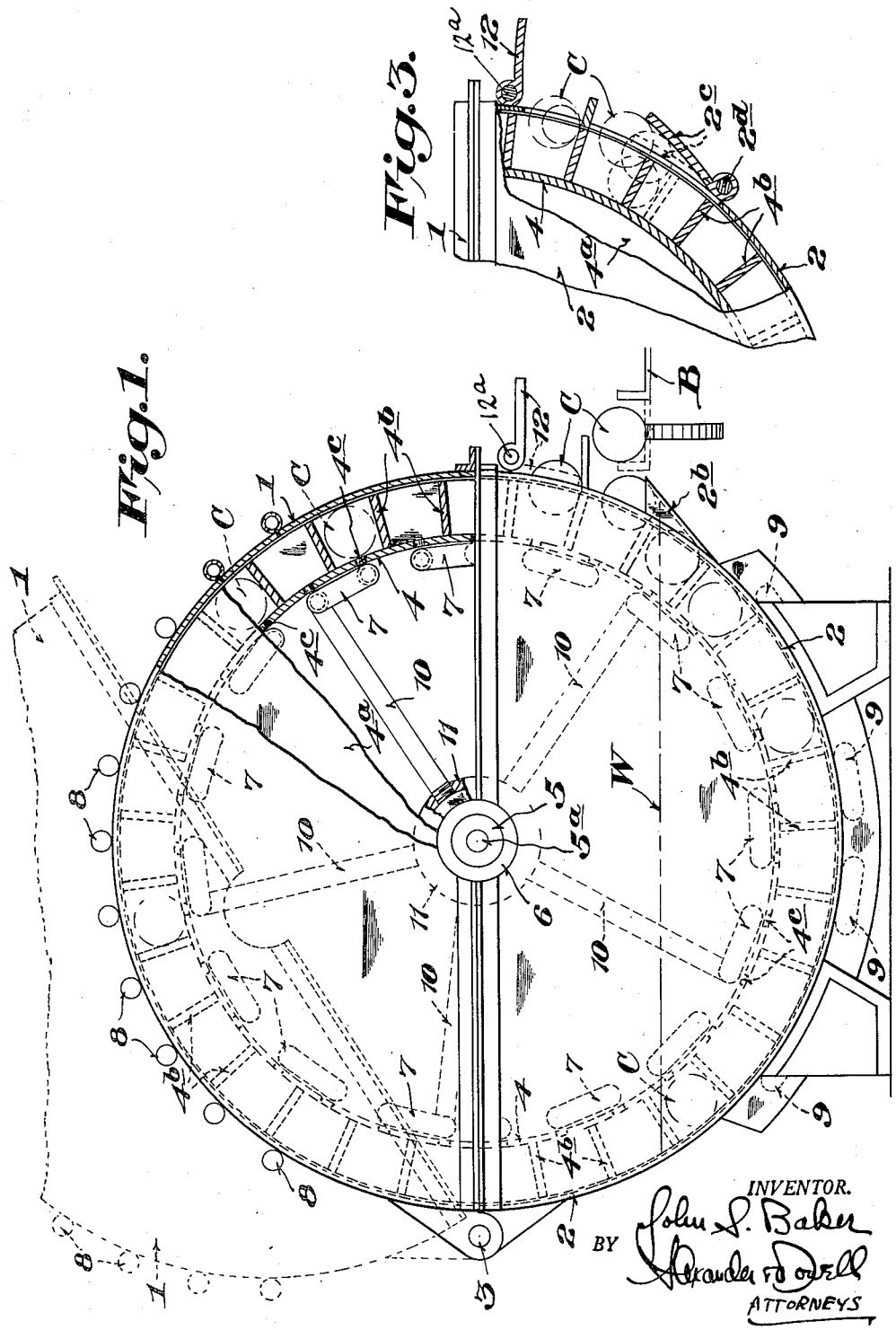
INVENTOR.
John S. Baker
BY Alexander Dowell
ATTORNEYS

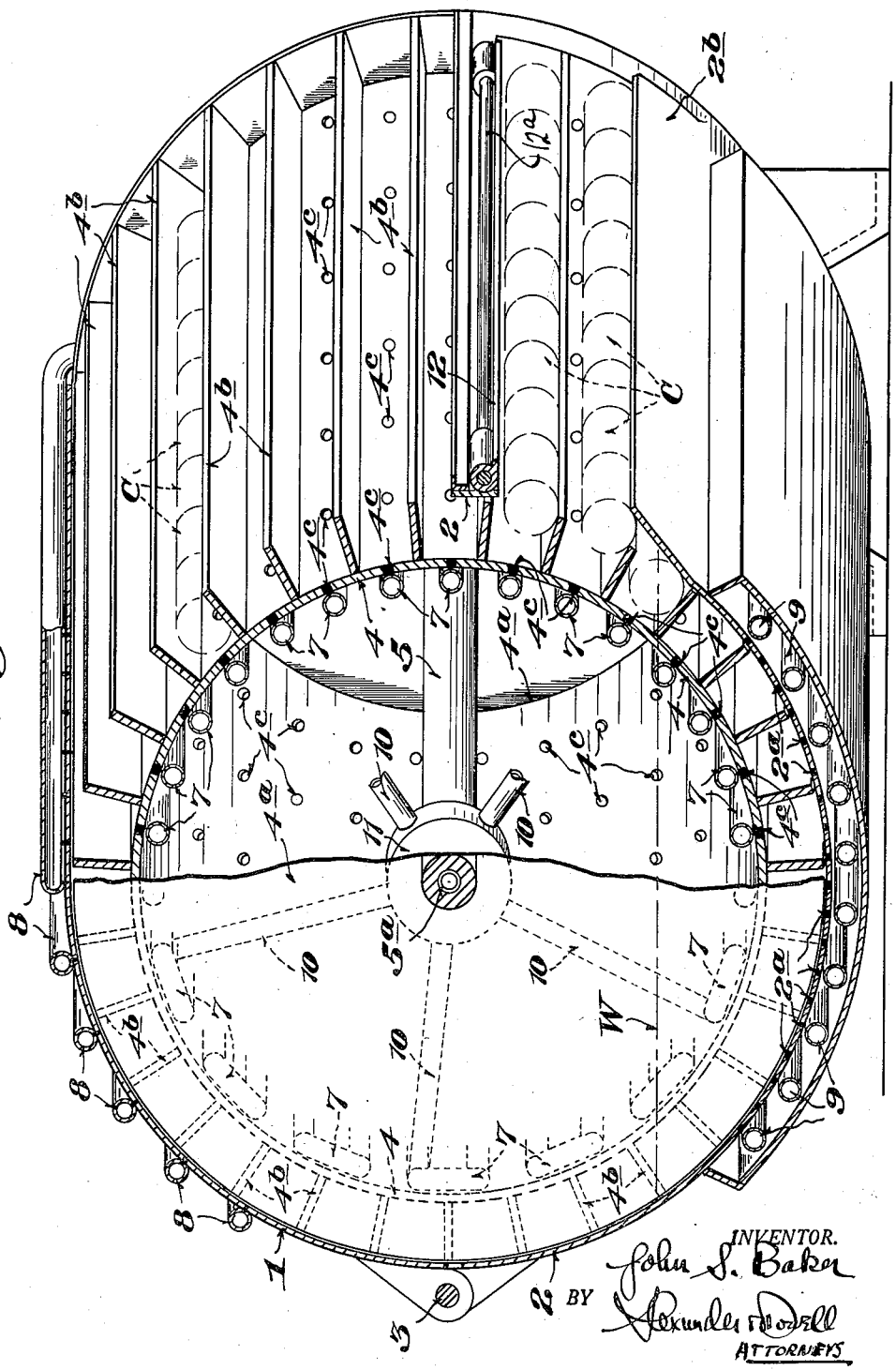

UNITED STATES PATENT OFFICE 2,585,213

PROCESSING MACHINE

John S. Baker, Los Angeles, Calif.

Application January 10, 1946, Serial No. 640,239

15 Claims. (Cl. 99—364)

This invention relates to an automatic processing machine for processing goods in cans, and is particularly adapted for use in the canning industry for processing foods hermetically sealed in the cans; the cans being aligned in successive rows therein, and the rows of cans being passed through the canway in the heating chamber, the rows of cans first passing through the boiling water or other fluids in a bottom canway where the contents of the cans are initially heated to the temperature of the fluid therein, and then continue through an upper canway containing steam under pressure and at high temperature whereby the contents of the cans are quickly raised to the latent heat of evaporation within the upper canway.

Many varieties of foods are canned by the canning industry. Some foods can be cooked in boiling water, at 212° F., while other foods are better processed at temperatures ranging up to 250° F., or 15 pounds of steam pressure. At the present time two processing methods are in common use by the canning industry.

One method is known as the open process, because no steam pressure is set up in the tank or heating chamber, the cooking being effected at the boiling of the water, or 212° F. In such open process cookers, the can feed and can discharge ports in the heating chamber are continuously open to the atmosphere and any steam pressure generated in the heating chamber quickly passes out through said ports; and the heating chamber may be made of light material, the general construction in open process machines being simple, and hence the machines may be sold at a moderate price. But these open process machines can only cook such foods that can be cooked in boiling water, or 212° F.

The other method used is a closed process utilizing temperatures up to 250° F., or 15 pounds steam pressure. In automatic closed process steam pressure cookers, the cans must be fed into the heating chamber and discharged therefrom by steam-tight valves to prevent the escape of steam from the chamber; and the heating chamber must be made of heavy material to withstand the steam pressure, and hence the cost of construction of these cookers is relatively high, and their selling price often puts them out of the financial reach of the average canner.

One object of my invention is to provide a cooker of the open process type with novel means of construction for maintaining steam pressure and high temperature in the upper section of the canway and heating chamber, so that foods requiring higher temperatures than 212° F. can be cooked therein, and the machines can be sold at a moderate price. In order to obtain these results, the steam must be confined to develop pressure and high temperature, and the amount of steam pressure depends on its resistance, therefore in my machine the entire upper section of the heating chamber is steam tight, and the can feed and can discharge ports in the lower section of the chamber, and the can pockets on the rotary can propeller are also steam tight and extend outwardly to practically close the upper canway, whereby the free flow of steam pressure entering the can pockets, by steam jets or otherwise in the upper section of the canway or heating chamber, will be retarded and a steam pressure and high temperature maintained in the upper can pockets of the propeller.

Another object of my invention is to locate the can inlet port and can outlet port in the chamber below the axis of rotation of the can impeller therein, to thereby seal the chamber above said axis.

Another object of the invention is to provide a shutter or door at the discharge port of the heating chamber adapted to open instantly at a predetermined time to permit a row of cans to be discharged as a unit, so that the small cans will not drop out ahead of the large cans as the propeller rotates.

Another object is to provide steam jet pipes on the outside of the top section of the chamber and opening thereinto, said jets discharging steam under high pressure into the can pockets of the propeller.

A further object is to provide other steam pipes on the inner surface of the can propeller registering with port holes in the propeller shell which will retard the free flow of steam into the can pockets and will permit a steam pressure to be generated in the can propeller from boiling the water in the bottom; and since this rising steam will be heavily saturated the hot pipes will precipitate much of the moisture and the steam will enter the can pockets in a gaseous state and at a higher steam pressure, thus further preventing condensing the high steam pressure jetted into the can pockets from the pipes on the outside of the top section of the chamber.

I will explain the invention with reference to the accompanying drawings which illustrate several practical embodiments thereof to enable others to adopt and use the same; and will summarize in the claims the novel features of construction and novel combinations of parts for which protection is desired.

2,585,213

3

In said drawings:

Figure 1 is an end elevation of my machine showing part of the upper section of the chamber broken away to show the position of the can propeller and the chamber enclosing the cylindrical canway, and also showing a part of the end flange of the can propeller broken away to show the can pockets and steam pipes.

Fig. 2 is a perspective end view partly in section, to show the gravity feed, the steam tight can pockets, the position of the steam pipes over the port holes in the propeller, and the steam pipes in the bottom of the chamber for boiling the water in the lower canway.

Fig. 3 is a detail section showing another means of feeding a row of cans into the can pockets of the can propeller, using part gravitation and part force.

Preferably the processing machine comprises a cylindrical chamber formed of upper and lower semi-cylindrical sections 1 and 2, closed at their ends and hinged along one side as at 3, section 1 resting freely on section 2 and adapted to be raised either by hand, or by excessive steam pressure which may develop in the upper part of the chamber 1 from the steam within same or otherwise.

Within the chamber formed by closed sections 1 and 2 is a cylindrical rotating can propeller which forms a canway between the propeller and the periphery of the wall of said chamber. The propeller consists of a cylindrical shell 4 welded on annular plates 4a at each end, fitting very closely against the inner faces of the ends of the chambers 1 and 2 to resist the escape of steam from the can pockets. Each plate 4a is welded onto shaft 5 which has its bearings 6 in the ends of chamber 2. Extending outwardly from the shell 4 are an annular series of fins 4b which are steam-tight welded to the shell 4 and steam-tight welded to the end plates 4a. These fins 4b extend outwardly and just clear the inside of the chamber 1, 2 so as to retard the passage of steam from one pocket to another over the top of the fins. The above construction forms substantially steam-tight pockets for the cans C, and since the entire upper section 1 is steam-tight, the only escape for the steam is over the tops of the can pockets down to the lower section 2 of the chamber, and since the steam escape is retarded by the small clearance between the fins or can pockets and chamber 1, 2, and since the volume of steam jetted into the upper canway is faster than it can escape, it will be seen that a steam pressure may readily be maintained in the entire upper canway 1 down to the horizontal plane of contact of the said sections 1 and 2.

In the center of the bottom of each can pocket is a series of port holes 4c in shell 4 which ports are covered with closed steam coils 7 to prevent the heavily saturated steam rising from the boiling water in the bottom of the can propeller from entering the can pockets and condensing the high temperature steam from the steam jet pipes 8 disposed on the outside of the upper chamber 1, said coils 7 also closing a portion of ports 4c to retard the escape of steam into the can pockets, and hence steam pressures may be built up in the can propeller chamber formed by the shell 4 and end plates 4a. Chamber 2 is initially filled with cold water by any convenient means up to the dot-and-dash line W. Thereafter the water level is maintained by the condensation from steam coils 7 and 9 which drain through ducts at the ends of the coils into chamber 2 and the can propeller chamber. The water has free passage through perforations 2a in the bottom of section 2, and 4c. Steam pipes 9 serve to boil the water in the lower canway 2, and the steam coils 7 serve to boil the water in the can propeller 4, 4a to generate steam pressure therein. Steam is fed into coils 7 through duct 5a in shaft 5 at branch pipes 10. 11 is a steam chamber fed by bore 5a of shaft 5 and feeds the branch pipes 10. Steam is supplied to steam pipe 9 and steam coils 7 from a boiler not shown.

Welded on the outside of the top of chamber section 1, and adapted to swing open therewith is a series of steam jet pipes 8, with the jets opening into the chamber for discharging steam under high pressure directly into the upper canway and can pockets of the can propeller. Pipes 8 are connected to a steam head pipe which passes through and provides a pivot pin for hinge 3 of the chamber sections 1 and 2, a valve regulating the steam supply in the head pipe.

At the front of the chamber 2 is a longitudinal flare 2b to accommodate a row of cans C as shown, the rows of cans being assembled and fed into feeding position by any feeding arrangement at B between the fins 4b, and as these fins rotate with the propeller 4 the row of cans C first gravitates down into the can pockets.

Another feeding means may be used, as shown in Fig. 3, whereby the row of cans C will gravitate down half way and the flare 2c which is pivoted as at 2d may then be swung inwardly as shown in dotted lines to force the cans into the pocket of the propeller between fins 4b. However, the former means is preferred since it requires no moving parts.

At the discharge end of the machine is a shutter or door 12 hinged as at 12a to section 2 which when closed prevents the smaller cans in the row rolling out ahead of the larger ones. This door 12 extends the full length of a row of cans C and is actuated or opened quickly when the cans are in discharging position opposite the door so that the entire row of cans will roll out together into a cooler (not shown).

The essential features of my machine are, the steam-tight upper section 1 to prevent the escape of any steam therefrom above the horizontal central plane between sections 1 and 2; also the can pockets in the propeller 4, 4a, 4b to retard the free flow of the jetted steam therefrom; also the gravity feed 2b; and the aligning door 12 at the discharge port to prevent the small cans in a row from dropping or rolling out ahead of the large ones.

The food or other products in cans C are constantly subject to processing by my novel means and method for maintaining steam pressure in an open process machine by reason of the steam-tight upper section 1. The gravitating of a row of cans or even one can into the can pockets can be performed by any desired feeding means B which is capable of forming the rows of cans C and pushing the row into the propeller can pockets. The rotation of the propeller 4, 4a, 4b simply allows the cans to gravitate into the pockets. The discharge shutter or door 12 is a part of the lower section 2, and when opened, the cans gravitate out of the chamber.

I do not limit my invention to the exact forms shown in the drawings, for obviously changes may be made therein within the scope of the claims; moreover, my novel machine may also be used for freezing foods in cans instead of cooking same, by utilizing a freezing medium or fluid in the coils 7, 8, 9 which would chill the pockets and frost the inside of the propeller; moreover, the machine may be used to process almost any kinds of packages besides canned goods which will pass through same.

I claim:

1. In a machine of the character specified, the combination of a cylindrical heating chamber formed of upper and lower semi-cylindrical sections closed at each end and adapted to hold a quantity of water in its lower portion; the upper section being steam tight and hinged to the lower section; an enclosed rotatable cylindrical can propeller in said chamber forming a cylindrical canway between the periphery of the propeller and walls of the chamber, said propeller having steam-tight longitudinal can-pockets on its periphery to accommodate successive rows of cans, said pockets extending outwardly from the periphery of said propeller and substantially sealing said canway to retard the free flow of steam from said can pockets; steam pipes carried within the inner periphery of said propeller adapted to boil the water in the bottom of the propeller and to generate steam pressure therein; the periphery of the propeller having perforations therein to emit steam pressure into the said can pockets; means for conducting steam to said pipes; means for heating the water in the lower canway; means for feeding cans into the can pockets of the propeller within the chamber; and means for discharging cans from the chamber; said feeding and discharging means being located in the lower section of the chamber so that steam pressure may be developed in the upper section of the chamber.

2. In a machine as set forth in claim 1, the upper section of the chamber having steam jet pipes attached thereto for jetting steam pressure in the upper portion of the canway, said pipes being swingable with the upper section.

3. In a machine as set forth in claim 1, said steam pipes within the propeller being placed against the perforations in the periphery of the propeller to retard the free flow into the upper canway of the heavy saturated steam rising from the boiling water in the bottom thereof which would precipitate moisture, and to permit the steam to enter the upper can pockets of the propeller in a substantially dry state and at a high temperature.

4. In a machine as set forth in claim 1, said can feeding means comprising a flare at the intake of the chamber, whereby the cans will gravitate into the propeller can pockets as the propeller rotates.

5. In a machine as set forth in claim 1, said can feeding means comprising a flare plate pivoted on the chamber and adapted to be swung, whereby the cans may gravitate part way and the flare then actuated to force the cans into the can pockets of the propeller.

6. In a machine as set forth in claim 1, said discharging means comprising a shutter pivoted on the lower section adapted to be opened instantly at a predetermined time to permit a row of cans to be discharged together, thereby eliminating the danger of smaller cans rolling out of the can pocket of the propeller in advance of the larger cans as the propeller can pockets slowly come into alignment with the shutter.

7. In a machine as set forth in claim 1, said feeding means feeding the cans into the can pockets of the can propeller within the chamber, below the point of discharge of the cans from said can pockets, and said cans being discharged from the can pockets of the can propeller within the chamber above the point the cans are fed into said can pockets, whereby the fed cans are first moved through the lower canway by the can propeller and continue through the upper canway where steam pressure and high temperatures may be maintained.

8. In a machine of the characted specified, the combination of a cylindrical heating chamber; a cylindrical rotatable can propeller therein forming a canway between the periphery of the propeller and the chamber, said canway communicating with an elongated can inlet port and an elongated can outlet port in said chamber; a plurality of longitudinal can pockets attached on the periphery of said can propeller adapted to engage successive rows of fed cans at the inlet and move the rows of cans around the canway to the outlet port in the chamber; said pockets extending outwardly to substantially seal the said canway to resist the escape of applied steam from said can pockets, whereby increased temperatures will be confined in said can pockets; means for supplying steam pressure to said can pockets; and means for feeding successive rows of cans through the inlet port in the chamber into the can pockets of the can propeller within the chamber.

9. In a machine as set forth in claim 8, said elongated can inlet port and elongated can outlet port in said chamber being located below the axis of rotation of the said can propeller within the chamber, whereby the portion of the chamber above the said axis may be steam-tight and whereby the steam pressure and high temperature may be confined therein.

10. In a machine of the character specified, the combination of an enclosed heating chamber; a cylindrical rotatable can propeller therein; a cylindrical track enveloping said can propeller enclosing a canway between the periphery of the propeller and said enveloping track, said canway communicating with an elongated can inlet port and an elongated can outlet port in said chamber; a plurality of longitudinal can pockets extending outwardly and attached on the periphery of the can propeller adapted to engage successive rows of fed cans at the inlet port and move the rows of cans around the said canway to the outlet port in said chamber; said can pockets substantially sealing the canway to restrict the escape of applied steam over the tops of said can pockets; means for supplying steam pressure to said can pockets, and means for feeding successive rows of cans through the inlet port in said chamber into said can pockets.

11. In a machine as set forth in claim 10, said elongated inlet port and elongated outlet port in the chamber being located below the axis of rotation of said can propeller within the chamber, whereby the portion of the chamber above said axis may be steam-tight and steam pressure and high temperatures may be confined therein.

12. In a machine of the character specified, the combination of a heating chamber with an enclosed cylindrical canway therein communicating with a can inlet port and a can outlet port in said chamber; a rotatable can propeller with a plurality of fin members axially attached on its periphery adapted to engage the fed cans at the inlet port in said chamber and move the cans around the canway to the outlet port in the chamber, said fin members forming enclosures for the cans therebetween and extending outwardly and substantially sealing said canway to resist the escape of applied steam over the tops of said fin members, means for supplying steam pressure to said can enclosures; and means for feeding the cans through the inlet port in said chamber into the said canway within the chamber.

13. In a machine of the character specified, the combination of a heating chamber with an enclosed cylindrical canway therein communicating with a can inlet port and a can outlet port in said chamber; a rotatable can propeller with a plurality of can moving members attached thereon, said members disposed transversely across said canway and adapted to engage the fed cans at the inlet and move the cans around the said canway to the outlet in said chamber; said members forming enclosures for the cans therebetween and substantially sealing said canway to resist the escape of applied steam past said members around the canway; means for supplying steam pressure to said canway; means for feeding the cans through the inlet port in said chamber into the canway therein; said can inlet port and said outlet port in the chamber being located below the axis of rotation of said can propeller within the chamber, whereby the portion of said chamber above the axis may be steam-tight and steam pressure and increased temperatures confined therein.

14. In a machine of the character specified; the combination of a heating chamber with an enclosed cylindrical rotatable can propeller therein, enclosing a cooking zone between the periphery of the propeller and the chamber; an enclosed cylindrical canway in said zone communicating with can inlet and can outlet ports in said chamber; a plurality of can enclosures axially attached on the periphery of said can propeller adapted to engage successive rows of fed cans at the inlet in the chamber and moving the rows of cans around the canway to the outlet in the chamber, said can inlet and can outlet in the chamber being located below the axis of the can propeller within the chamber, said can enclosures substantially sealing the canway above the axis to retard the escape of applied steam pressure from said can enclosures, said chamber and can propeller adapted to hold a quantity of water in their lower portions, steam pipes to heat the water in the chamber and steam pipes within the can propeller to generate steam pressure therein, perforations in the periphery of the can propeller to emit the steam pressure into said can enclosures; means for feeding successive rows of cans into the can enclosures of the can propeller within the chamber and means for discharging the cans from the chamber, the lower portion of said canway being positioned in the water in the chamber.

15. In a machine of the character specified, the combination of a heating chamber adapted to hold a quantity of water in its lower portion with steam pipes to heat said water, an enclosed cylindrical canway within said chamber communicating with can inlet and can outlet ports in the chamber; a rotatable can propeller with a plurality of can enclosures extending outwardly and axially attached on the periphery of said can propeller adapted to engage successive rows of fed cans at the inlet in the chamber and move the rows of cans around the canway to the outlet in the chamber, said can enclosures substantially sealing the upper portion of the canway to retard the escape of applied steam pressure and high temperatures therefrom, means for applying steam pressure to the upper canway; the lower portion of said canway being positioned in the water in the chamber whereby the successive rows of cans are first moved through the water and then continue through the upper canway and are discharged from the chamber; means for feeding the successive rows of cans into the can pockets of the can propeller within the chamber below the axis of said can propeller, and means for discharging the cans from the chamber.

JOHN S. BAKER.

REFERENCES CITED

The following references are of record in the file of this patent:

UNITED STATES PATENTS

| Number | Name | Date |
|---|---|---|
| 1,104,425 | Keast | July 25, 1914 |
| 1,225,172 | Privett | May 8, 1917 |
| 1,301,428 | Gitterman | Apr. 22, 1919 |
| 1,721,562 | Keeney | July 23, 1929 |
| 1,939,372 | Thompson | Dec. 12, 1933 |
| 1,959,395 | Thompson | May 22, 1934 |